(12) United States Patent
Okamoto et al.

(10) Patent No.: US 7,988,183 B1
(45) Date of Patent: Aug. 2, 2011

(54) AIRBAG SYSTEM

(75) Inventors: Yutaka Okamoto, Wako (JP); Eric Drake, Plain City, UT (US); Earl Nelson, West Haven, UT (US)

(73) Assignees: Honda Motor Co., Ltd., Tokyo (JP); Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 12/831,671

(22) Filed: Jul. 7, 2010

(51) Int. Cl.
*B60R 21/16* (2006.01)
(52) U.S. Cl. .................................... 280/728.2
(58) Field of Classification Search ............. 180/274; 280/728.2
See application file for complete search history.

(56) References Cited

U.S. PATENT DOCUMENTS
6,422,372 B2 * 7/2002 Ransil ...................... 193/35 SS FOREIGN PATENT DOCUMENTS
| JP | 2002-283939 | 10/2002 |
| JP | 2006-282105 | 10/2006 |
| JP | 2009-224381 | 10/2009 |

\* cited by examiner

*Primary Examiner* — Faye M. Fleming
(74) *Attorney, Agent, or Firm* — Rankin, Hill & Clark LLP

(57) ABSTRACT

Opposite end portions of an airbag made of a folded metal plate and formed into a tubular shape are capped by respective end caps and are attached to an attachment surface of a front pillar, and the airbag is deployed along the front pillar by use of gas produced by an inflator, thereby protecting by the airbag a pedestrian that collides with the front pillar. Bolts penetrating through long holes formed in the end portions of the airbag and bolt holes of the end caps are screwed to weld nuts, and thereby the end portions of the airbag are slidably supported by the end caps. Accordingly, when the airbag is deployed the long holes slide with respect to the respective bolts toward inside in a longitudinal direction of the airbag, and a tension in the longitudinal direction of the airbag is prevented from acting on a metal plate of the airbag, thereby enabling the airbag to be deployed reliably near the end caps. Therefore, it is possible to inflate the airbag evenly along its entire length and thereby enhancing the shock absorbing performance when a pedestrian collides.

17 Claims, 10 Drawing Sheets

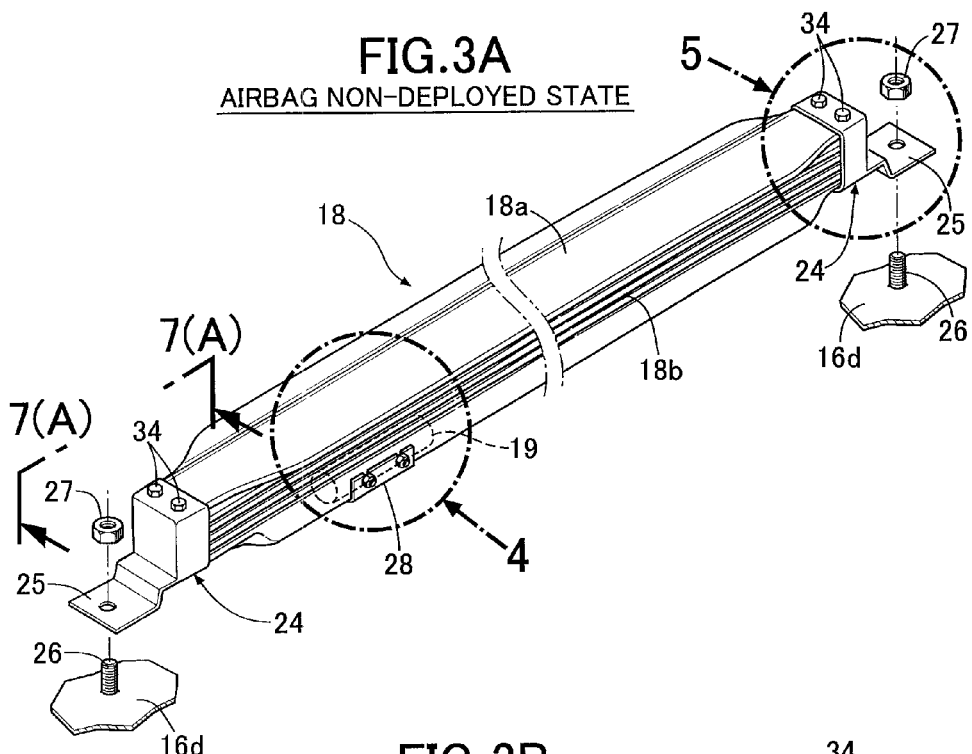
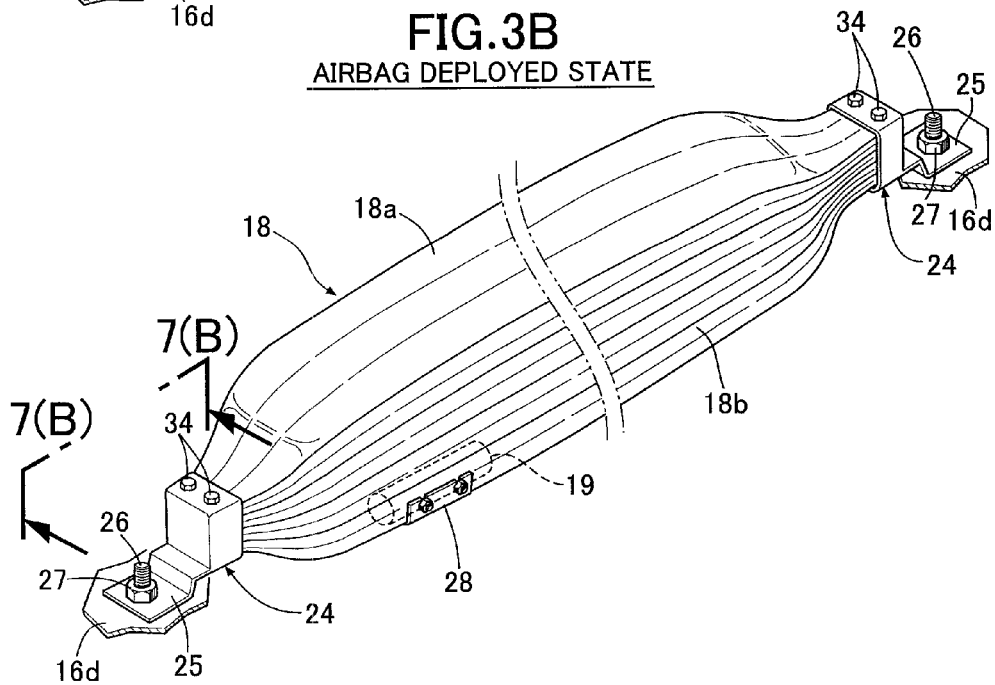

AIRBAG DEPLOYED STATE

AIRBAG SYSTEM

BACKGROUND OF THE INVENTION

1. Field of the Invention

The present invention relates to an airbag system comprising: an airbag made of a folded metal plate; and cap members which respectively cap opposite end portions of the airbag, the cap members being fixed to a vehicle body panel, the airbag system protecting a pedestrian by deploying the airbag by use of gas produced by an inflator.

2. Description of the Related Art

Japanese Patent Application Laid-open No. 2002-283939 has made publicly known an airbag system for protecting a pedestrian which is configured so that: a folded airbag made of cloth is stored inside a pillar garnish for covering a front surface of a front pillar of an automobile; in collision with a pedestrian, gas produced by an inflator is supplied to the airbag, and thus deploys the airbag along the front surface of the front pillar from a rip which is made when the pillar garnish breaks; and the pedestrian is protected with the airbag thus deployed.

In addition, Japanese Patent Application Laid-open No. 2006-282105 has made publicly known a shock absorbing structure for protecting a pedestrian which is configured so that: a pillar garnish for covering a front surface of a front pillar of an automobile is supported by a pillar skeletal member with a link-type pillar driving mechanism being interposed in between; in collision with a pedestrian, the pillar driving mechanism lifts the pillar garnish up from the pillar skeletal member so as to allow the pillar garnish to make stroke motions; and the pillar garnish thus absorbs the collision energy.

In the case of the invention disclosed in Japanese Patent Application Laid-open No. 2002-283939, however, it is difficult to keep the airbag deployed for a long time because the airbag is made of cloth; therefore, the airbag may not fully exhibit its shock absorbing effects depending on timing at which the pedestrian collides with the front pillar.

In the meantime, the invention disclosed in Japanese Patent Application Laid-open No. 2006-282105 has a problem that: the structure of the link-type pillar driving mechanism for movably supporting the pillar garnish with the pillar skeletal member is complicated; thus, the number of parts increases, and the cost increases.

Against this background, through Japanese Patent Application No. 2009-224381, one of the present assignees has already proposed an airbag system which is configured so that: instead of the conventional airbag made of cloth, an airbag made of metal is folded and arranged in a front pillar; and gas produced by an inflator deploys this airbag toward the outside of a vehicle body.

In the airbag included in this airbag system, opposite end portions of a metal plate folded in the shape of a tube are inserted into respective openings of box-shaped end caps and are fixed thereto by welding. These end caps are fixed to an attachment surface of the front pillar by bolts. Once the folded airbag is deployed, the airbag begins to contract in the longitudinal direction with an increase in the diameter. However, the above-described conventional airbag is incapable of moving in the longitudinal direction because the opposite end portions of the airbag are fixed to the respective end caps. As a result, the tension of the airbag becomes excessive. This makes it difficult for the airbag to be deployed particularly near the end caps thereof, resulting in the possibility of lowering the shock absorbing performance thereof.

SUMMARY OF THE INVENTION

The present invention has been made in consideration of the above-described situation. An object of the present invention is to enhance the shock absorbing performance of a metal-made airbag for protecting a pedestrian by making the airbag capable of being deployed evenly through the entire length thereof.

In order to achieve the above object, according to a first feature of the present invention, there is provided an airbag system comprising: an airbag made of a folded metal plate; and cap members which respectively cap opposite end portions of the airbag, the cap members being fixed to a vehicle body panel, the airbag system protecting a pedestrian by deploying the airbag by use of gas produced by an inflator, wherein the opposite end portions of the airbag and the respective cap members are connected movably relative to each other when the airbag is deployed.

With the foregoing configuration, since the cap members for capping the respective opposite end portions of the airbag made of a folded metal plate are fixed to the vehicle body panel, it is possible to protect a pedestrian by deploying the airbag by use of gas produced by the inflator. When the airbag is deployed, the airbag contracts in the longitudinal direction thereof in accordance with an increase in the diameter. In this respect, it is possible to prevent the tension of the airbag in the longitudinal direction from becoming excessive by allowing the opposite end portions of the airbag to move relative to the respective cap members. This makes the opposite end portions of the airbag, which would otherwise be hard to be deployed, capable of being deployed as well as the middle portion of the airbag. Consequently, an excellent shock absorbing performance can be obtained throughout the length of the airbag.

According to a second feature of the present invention, in addition to the first feature, there is provided the airbag system, wherein long holes are formed in the opposite end portions of the airbag, each long hole extending in a longitudinal direction of the airbag, and shaft members fixed to the cap members penetrate the respective long holes.

With the foregoing configuration, since the long holes each extending in the longitudinal direction of the airbag are formed in the opposite end portions of the airbag and the shaft members fixed to the cap members penetrate the respective long holes, the long holes can slide relative to the respective shaft members when the airbag is deployed. This makes it possible to prevent the tension of the airbag in the longitudinal direction from becoming excessive, and also to prevent the opposite end portions of the airbag from coming off from the respective cap members.

According to a third feature of the present invention, in addition to the second feature, there is provided the airbag system, wherein a space extending along each of the shaft members is formed between an outer surface of the airbag in a folded state and an inner surface of the corresponding cap member, and each of the opposite end portions of the airbag is deployed to make the space disappear.

With the foregoing configuration, since the space is formed between the outer surface of the airbag in a folded state and the inner surface of the corresponding cap member so as to extend along the direction of the shaft member, it enables the opposite end portions of the airbag to be deployed further securely by allowing the opposite end portions of the airbag to be deployed in such a way as to make the spaces disappear.

According to a fourth feature of the present invention, in addition to any one of the first to third features, there is provided the airbag system, wherein, in the airbag in a folded state, a surface facing in a front-and-rear direction of a vehicle body is flat; and a surface facing in a left-and-right direction of the vehicle body is folded in an accordion shape.

With the foregoing configuration, since the airbag in a folded state has a flat surface facing in the front-and-rear direction of the vehicle body and a surface folded in an accordion shape facing in the left-and-right direction of the vehicle body, it enables the airbag to effectively absorb an impact on a pedestrian who collides from the front side by deploying the airbag to a large extent in the front-and-rear direction of the vehicle body.

According to a fifth feature of the present invention, in addition to any one of the first to fourth features, there is provided the airbag system, wherein the cap members are each formed of a box shape having an opening to which the corresponding end portion of the airbag in a folded state is inserted.

With the foregoing configuration, since each cap member is formed of a box shape which has the opening into which the corresponding end portion of the airbag in a folded state is inserted, it enables the cap members to be fixed to the respective end portions easily and securely.

According to a sixth feature of the present invention, in addition to any one of the first to fifth features, there is provided the airbag system, wherein a gap between the shaft member and the long hole functions as a vent hole of the airbag.

With the foregoing configuration, since the gap between the shaft member and the long hole functions as a vent hole, it is possible to reduce the processing costs by requiring no formation of special vent hole in the airbag.

The above description, other objects, characteristics and advantages of the present invention will be clear from detailed descriptions which will be provided for the preferred embodiments referring to the attached drawings.

BRIEF DESCRIPTION OF THE DRAWINGS

FIGS. 1 to 9B show a first embodiment of the present invention:

FIG. 1 is a plan view of a front part of a vehicle body of an automobile;

FIG. 2 is an enlarged cross-sectional view taken along a line 2-2 in FIG. 1;

FIG. 3A is a perspective view of an airbag in a non-deployed state;

FIG. 3B is a perspective view of the airbag in a deployed state;

FIG. 4 is an enlarged and exploded perspective view of a part indicated by an arrow 4 in FIG. 3A;

FIG. 5 is an enlarged perspective view of a part indicated by an arrow 5 in FIG. 3A;

FIG. 6 is a view corresponding to FIG. 2 and explaining an operation when the airbag deploys;

FIG. 8 is a cross-sectional view taken along a line 8-8 in FIG. 7;

FIG. 9B is a cross-sectional view taken along a line 9(B)-9(B) in FIG. 7B;

FIG. 10A is a view corresponding to FIG. 7A; and

FIG. 10B is a view corresponding to FIG. 7B.

DESCRIPTION OF THE PREFERRED EMBODIMENTS

A first embodiment of the present invention will be described below based on FIGS. 1 to 9B.

Figure 1:
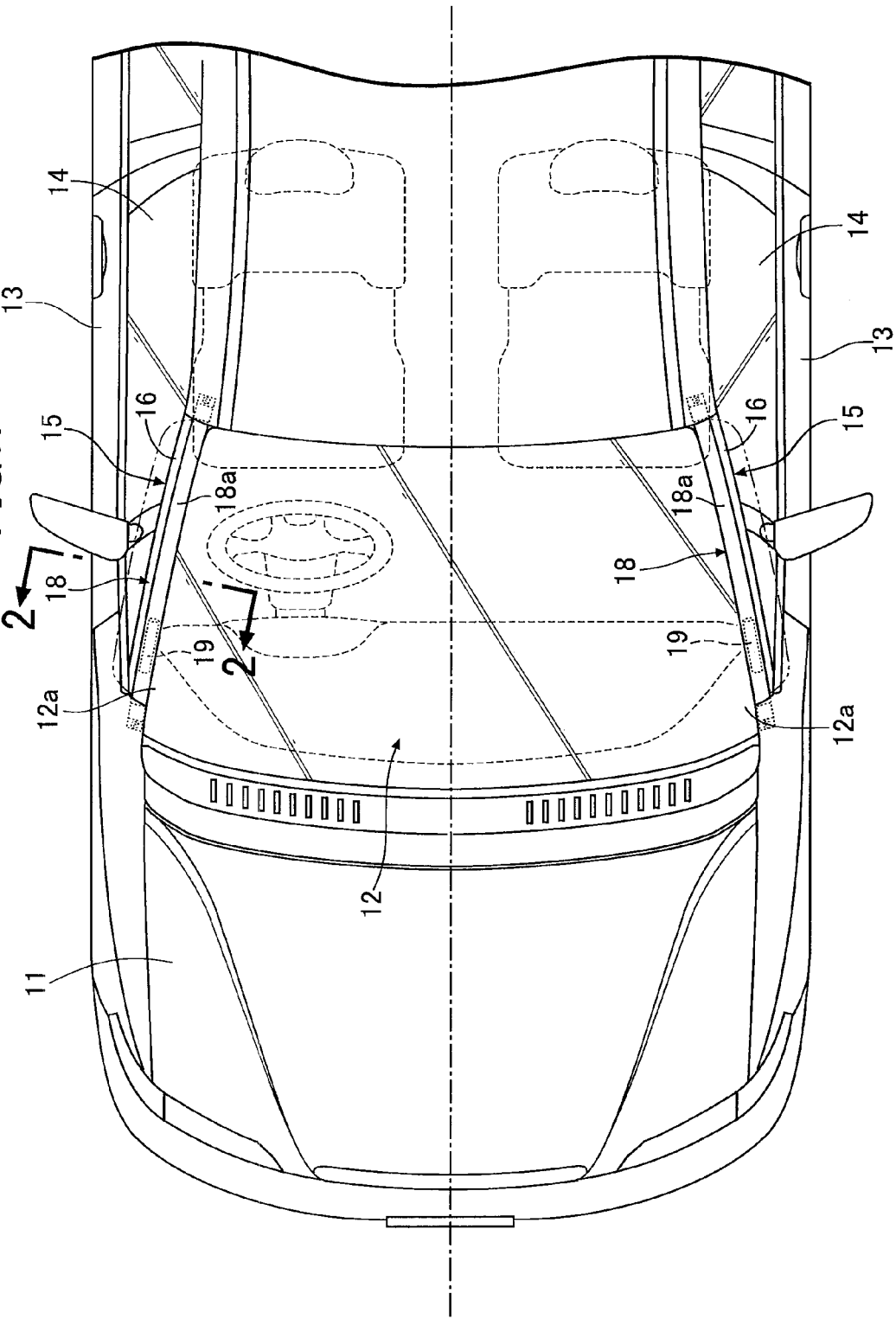

As shown in FIG. 1, an automobile has a front windshield 12 in the rear of a hood 11, and front pillars 15, 15 are arranged in a way that the front pillars 15, 15 are interposed between left and right edge portions 12a, 12a of the front windshield 12 and door glasses 14, 14 of front doors 13, 13, respectively.

Figure 2:
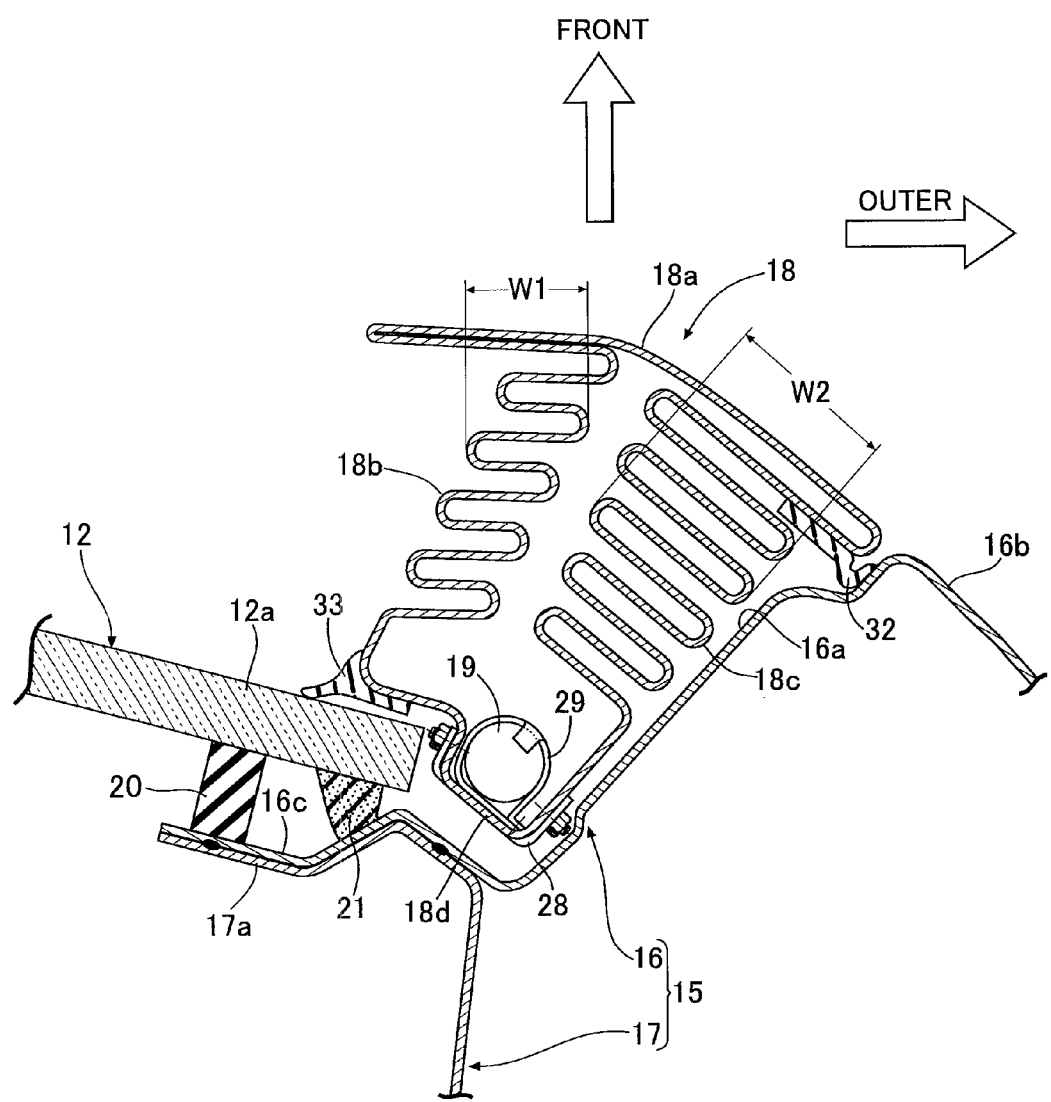

As shown in FIG. 2, the front pillar 15 is formed in a closed cross section by bonding together an outer panel 16 situated in an outer side of a vehicle body and an inner panel 17 situated in an inner side of the vehicle body. An airbag 18 made of metal, which also serves as a pillar garnish, is folded and arranged in front of a front surface 16a of the outer panel 16. The corresponding edge portion 12a of the front windshield 12 is adhered to front faces of joint sections 16c, 17a of the outer panel 16 and the inner panel 17, respectively, with an adhesive 21 with a dam rubber 20 being interposed in between.

The airbag 18 obtained by folding a metal plate into a tubular shape includes a garnish part 18a, a windshield-side folded part 18b, an outer panel-side folded part 18c and an inflator supporting part 18d. The garnish part 18a smoothly extends from a side surface 16b of the outer panel 16 of the front pillar 15 toward the front windshield 12, and functions as a pillar garnish arranged between the outer panel 16 and the front windshield 12.

The windshield-side folded part 18b and the outer panel-side folded part 18c are each folded in an accordion shape behind (in the rear of) the garnish part 18a for the purpose of securing the expansion margin of the airbag 18 when it is deployed. At this point, a folded width W2 of the outer panel-side folded part 18c is set larger than a folded width W1 of the windshield-side folded part 18b.

As clear from FIGS. 3A, 3B, 5 and 7A to 9B, the opposite end portions of the airbag 18 in a folded state are molded to be thinner by pressing, and are fitted into openings of boxed-shaped end caps 24, 24, respectively, to be fixed thereto. In this way, since the end caps 24, 24 are made into the shape of a box having an opening into which the folded end portion of the airbag 18 is inserted, the end portions of the airbag 18 can be easily and securely fixed to the end caps 24, 24. Note that the folded airbag 18 may have a uniform width over the entire length thereof.

Paired stays 25, 25 unitarily formed with the end caps 24, 24 are fixed to an attachment surface 16d of the outer panel 16 of the front pillar 15. Each stay 25 is one obtained by bending a strip-shaped metal plate into a crank shape. The stay 25 is fixed to the attachment surface 16d of the outer panel 16 with a stud bolt 26 and a nut 27.

Figure 7A:
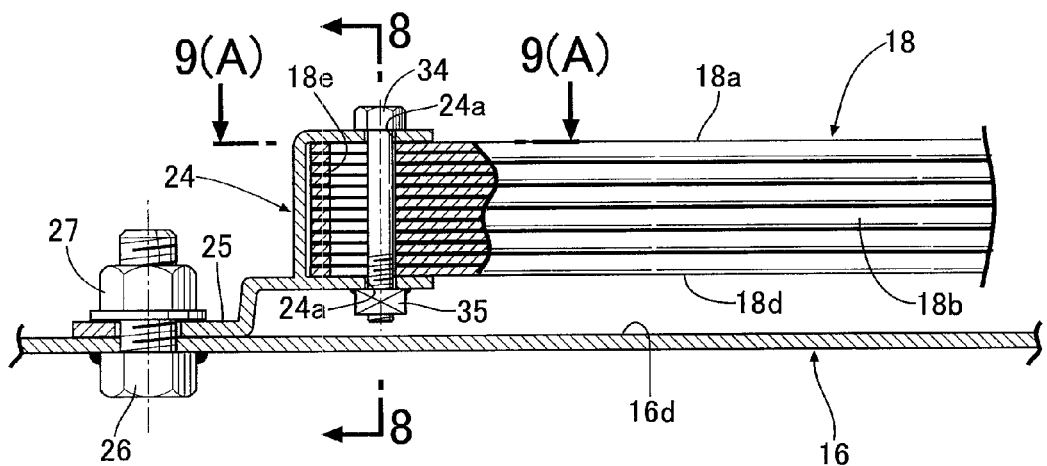
FIG. 7A is a cross-sectional view taken along a line 7(A)-7(A) in FIG. 3A.
Figure 7B:
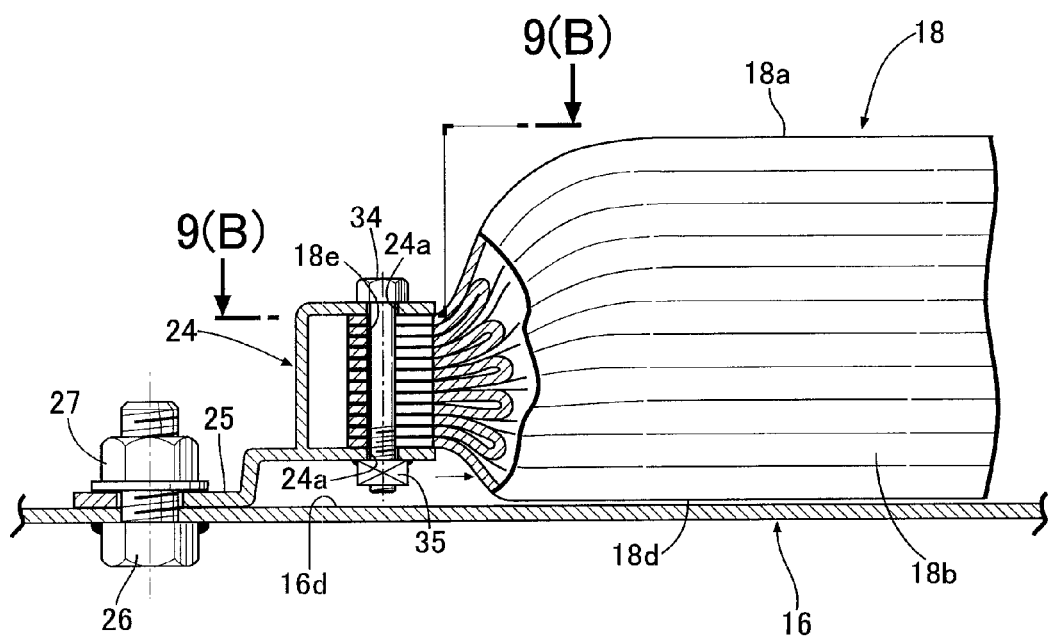
FIG. 7B is a cross-sectional view taken along a line 7(B)-7(B) in FIG. 3B.
Figure 8:
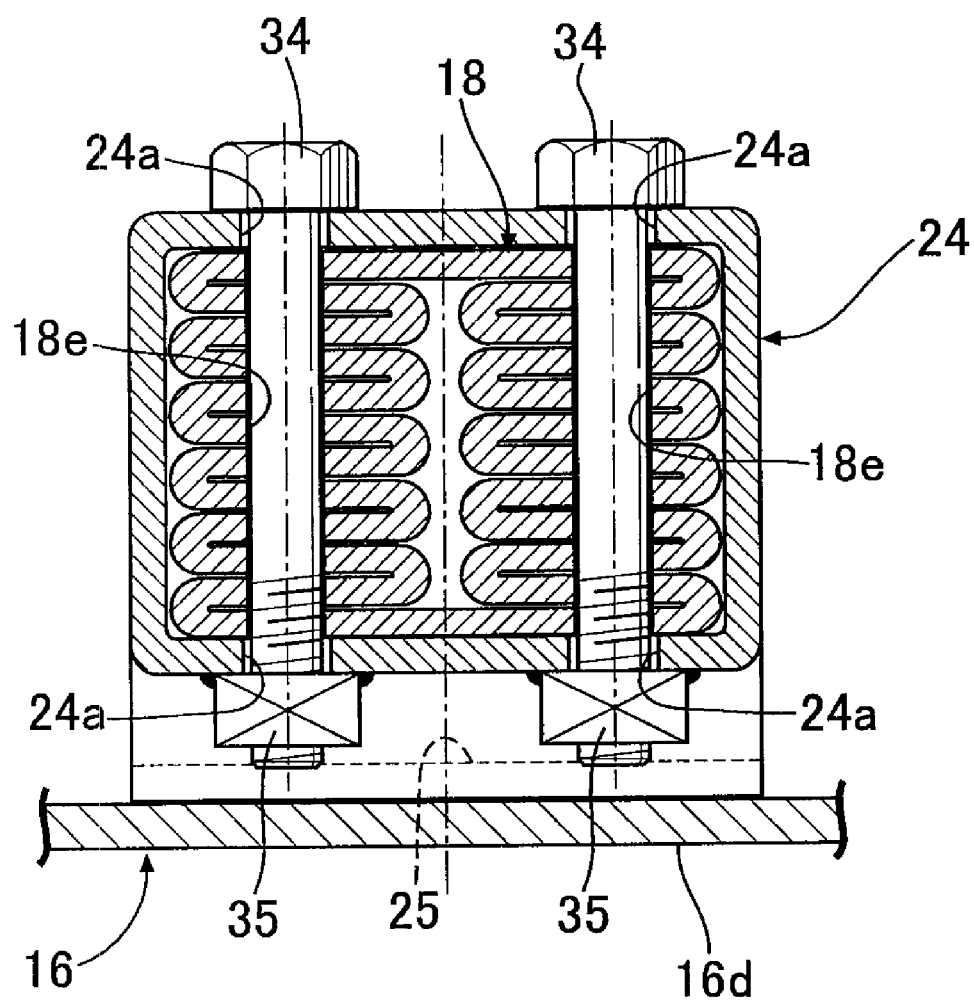
Figure 9A:
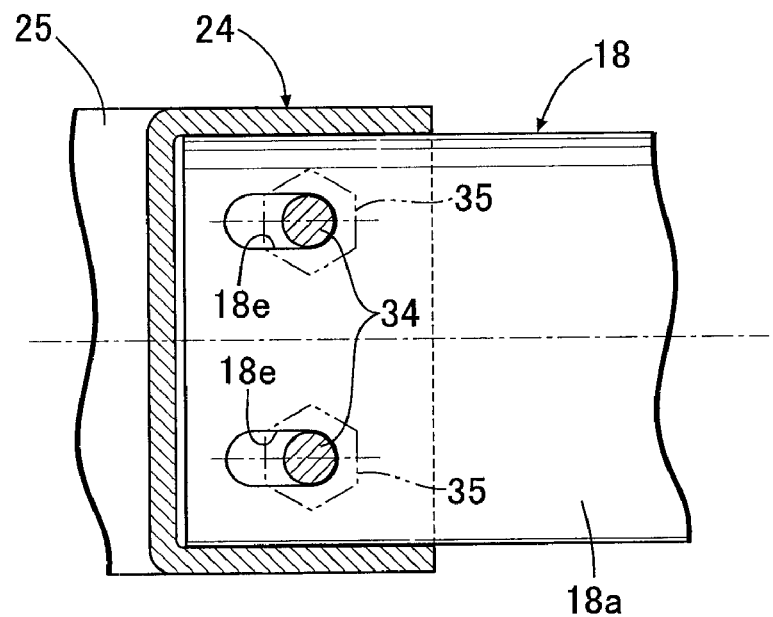
FIG. 9A is a cross-sectional view taken along a line 9(A)-9(A) in FIG. 7A.
Figure 9B:
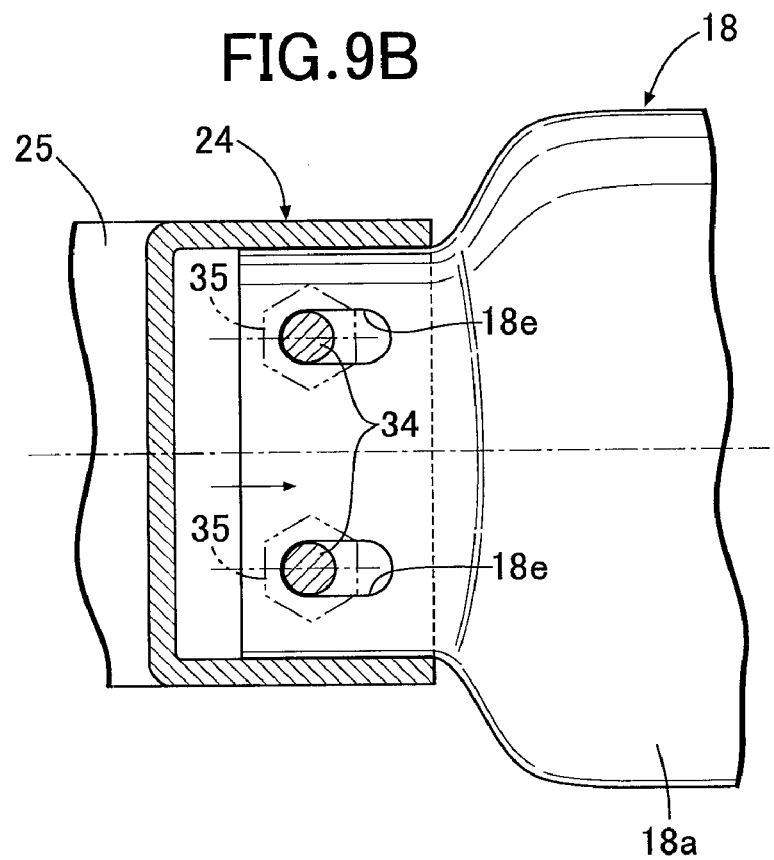

Two long holes 18e, 18e each extending in a longitudinal direction of the airbag 8 penetrate the respective end portions of the airbag 18. Bolts 34, 34 respectively inserted in bolt holes 24a of the end caps 24 and the long holes 18e, 18e of the airbag 18 are respectively screwed to weld nuts 35, 35 provided to the stay 25. While the airbag 18 is not deployed as shown in FIGS. 7A and 9A, the bolts 34, 34 are respectively located at inner ends of the long holes 18e, 18e in the longitudinal direction of the airbag 18. While the airbag 18 is deployed as shown in FIGS. 7B and 9B, the long holes 18e, 18e respectively slide with respect to the bolts 34, 34. As a result, the bolts 34, 34 are respectively located at outer ends of the long holes 18e, 18e in the longitudinal direction of the airbag 18.

Figure 4:
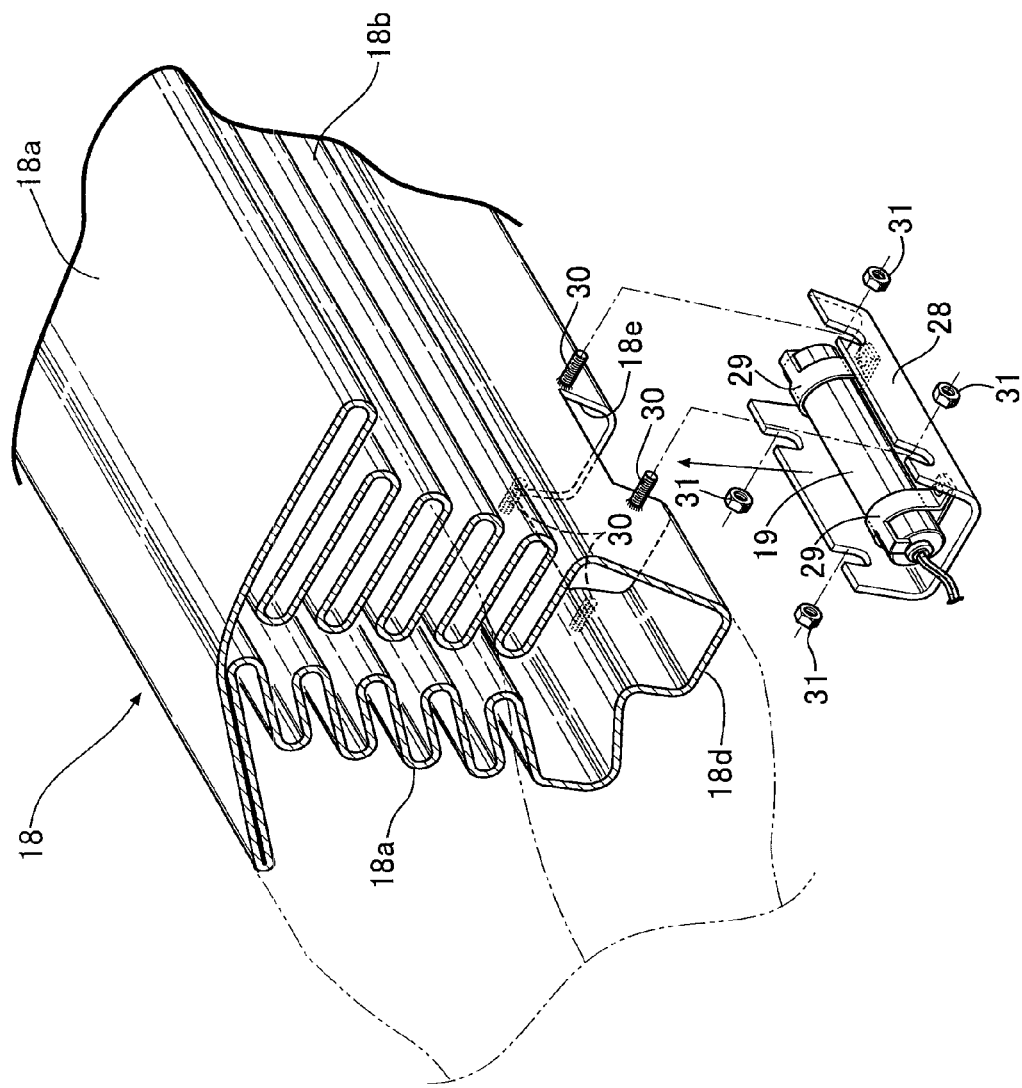
Figure 5:
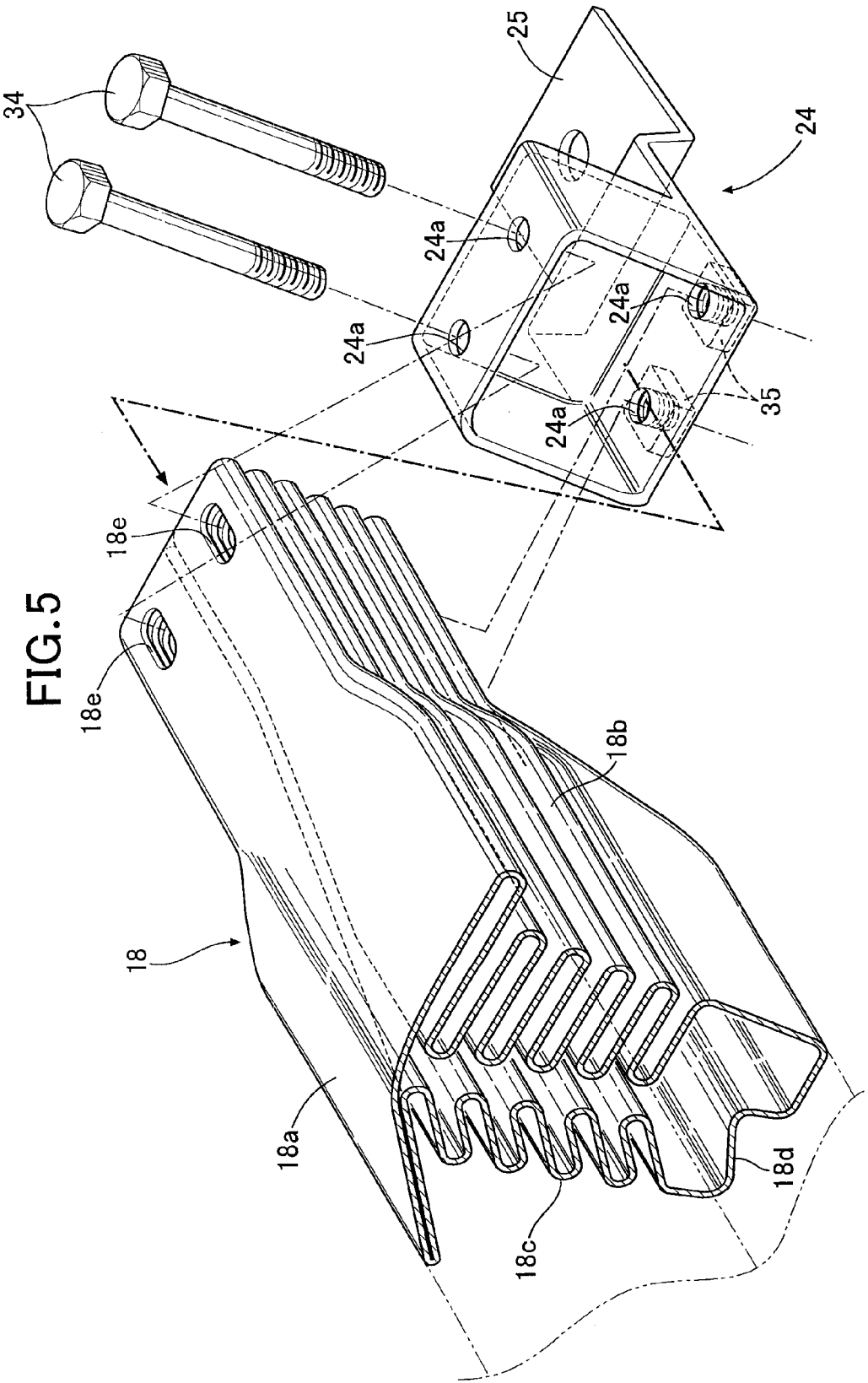

As clear from FIGS. 2 to 4, an inflator 19 configured to produce gas for deploying the airbag 18 is attached in a lower end portion of the inflator supporting part 18d which faces the garnish part 18a with the windshield-side folded part 18b and the outer panel-side folded part 18c interposed therebetween. The inflator 19 having a cylindrical shape is fixed to an inner surface of an attachment bracket 28 having an U-shape cross section with two fastening devices 29, 29. This attachment bracket 28 is overlaid an opening 18e formed in the inflator supporting part 18d of the airbag 18 from outside and fixed to the inflator supporting part 18d with bolts 30 and nuts 31.

As clear from FIG. 2, an outer panel-side lip 32 is arranged in a boundary between the garnish part 18a and the outer panel-side folded part 18c of the airbag 18. This outer panel-side lip 32 is configured to be in contact with the front surface 16a of the outer panel 16. A windshield-side lip 33 is installed in a boundary between the windshield-side folded part 18b and the inflator supporting part 18d of the airbag 18. This windshield-side lip 33 is configured to be in contact with a front surface of the edge portion 12a of the front windshield 12. The outer panel-side lip 32 and the windshield-side lip 33 block rainwater and the like from entering the inflator supporting part 18d side of the airbag 18; therefore, the inflator 19 can be protected.

Next, descriptions will be provided for an operation of the embodiment of the present invention including the foregoing configuration.

In a normal time when the airbag 18 is not deployed, the garnish part 18a of the airbag 18 smoothly extends toward the side surface 16b of the outer panel 16 of the front pillar 15, and exhibits a pillar garnish function. Accordingly, this makes it possible to abolish a specialized pillar garnish, and thus to reduce parts in number. Furthermore, by replacing the conventional pillar garnish, the airbag 18 can be compactly installed between the front pillar 15 and the front windshield 12. Therefore, neither case nor cover is required for storing the folded airbag 18, while a good external appearance around the front pillar 15 is maintained.

Figure 6:
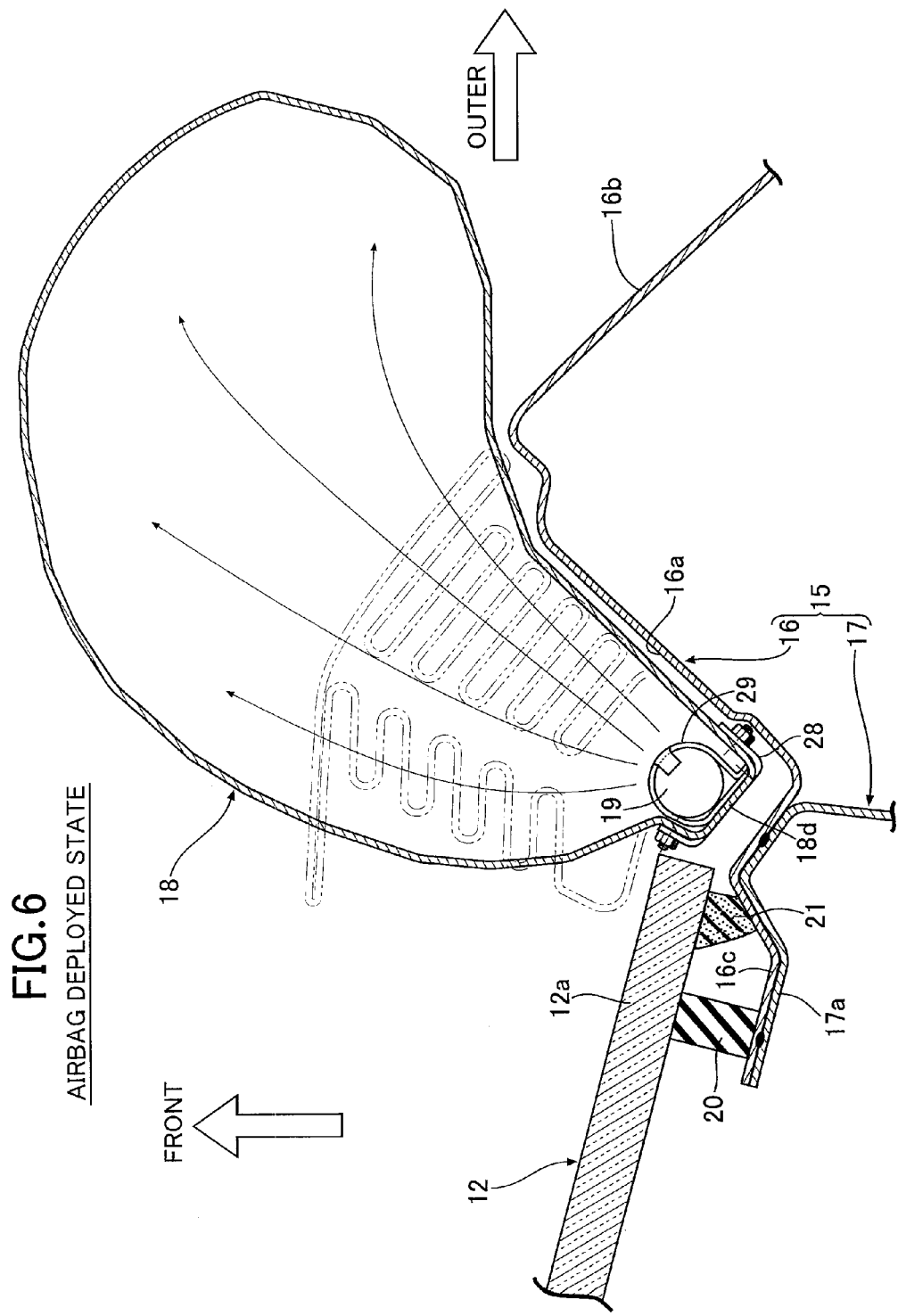

Once it is detected that the vehicle has collided with a pedestrian, the inflator 19 is actuated, and an internal pressure of the airbag 18 increases due to the gas produced by the inflator 19. Then, as shown in FIG. 6, due to this increase in the internal pressure, the windshield-side folded part 18b and the outer panel-side folded part 18c of the airbag 18 which are folded in an accordion shape are first inflated toward the outside of the vehicle body, then deployed in the left and right directions in a way that the front surface 16a and the side surface 16b of the outer panel 16 of the front pillar 15 are covered.

At this time, the airbag 18 is deployed to a large extent in the frontward and rearward directions, and is capable of effectively absorbing an impact on a pedestrian who collides from the front side, since the garnish part 18a and the inflator supporting part 18d forming the front and back surfaces of the folded airbag 18 are flat whereas the windshield-side folded part 18b and the outer panel-side folded part 18c forming the left and right surfaces of the folded airbag 18 are folded in an accordion shape.

In the meantime, once the airbag 18 is deployed, the airbag changes its shape in such a way that the airbag 18 contracts in the longitudinal direction in accordance with an increase in the diameter thereof. As a result, tension occurs within the metal plate of the airbag 18 in the longitudinal direction. For the purpose of obtaining an excellent shock absorbing performance through the entire length of the airbag 18, it is desirable that the airbag 18 should have an increasing diameter starting immediately from the parts thereof fixed to the end caps 24, 24. However, there is a problem that the opposite end portions of the airbag 18 are hard to be deployed due to the occurrence of the above-described tension.

In the present embodiment, however, once the tension occurs in the longitudinal direction with the deployment of the airbag 18, the long holes 18e, 18e slide inward with respect to the respective bolts 34, 34 in the longitudinal direction of the airbag 18 as shown in FIGS. 7A, 7B, 9A and 9B. Accordingly, the opposite end portions of the airbag 18 move inward in the longitudinal direction, inhibiting the occurrence of the tension. Consequently, the opposite end portions of the airbag 18 can be deployed securely; therefore, the airbag 18 can exert the excellent shock absorbing performance through the entire length thereof.

Moreover, while the airbag 18 is being deployed, gaps are formed between the bolts 34, 34 and the long holes 18e, 18e, and gas leaks from the gaps. When these gaps are used as vent holes of the airbag 18, no special vent holes need to be formed in the metal plate of the airbag 18, resulting in a reduction in the processing costs. Alternatively, when vent holes are to be formed in the airbag 18, the number of the vent holes can be reduced.

Furthermore, an airbag system for a pedestrian has a characteristic that time which lapses before the pedestrian collides with the front pillar 15 tends to relatively vary largely depending on the physique of the pedestrian and the velocity at which the vehicle is running at the time of collision. For this reason, a problem with a conventional airbag made of cloth is that an inflator with a large volume, which is configured to produce the gas continuously, is required for the purpose of keeping the airbag deployed for a predetermined length of time. On the contrary, the present embodiment employs the airbag 18 made of metal. Once deployed, the airbag 18 is capable of keeping the deployed state even after the supply of the gas is ended. This plastic deformation allows the airbag 18 to absorb the shock of the collision with a pedestrian. For this reason, the airbag 18 exhibits its shock absorbing capability effectively no matter what timing a pedestrian may collides with the front pillar 15 even with the inflator 19 having a smaller volume.

Figure 10A:
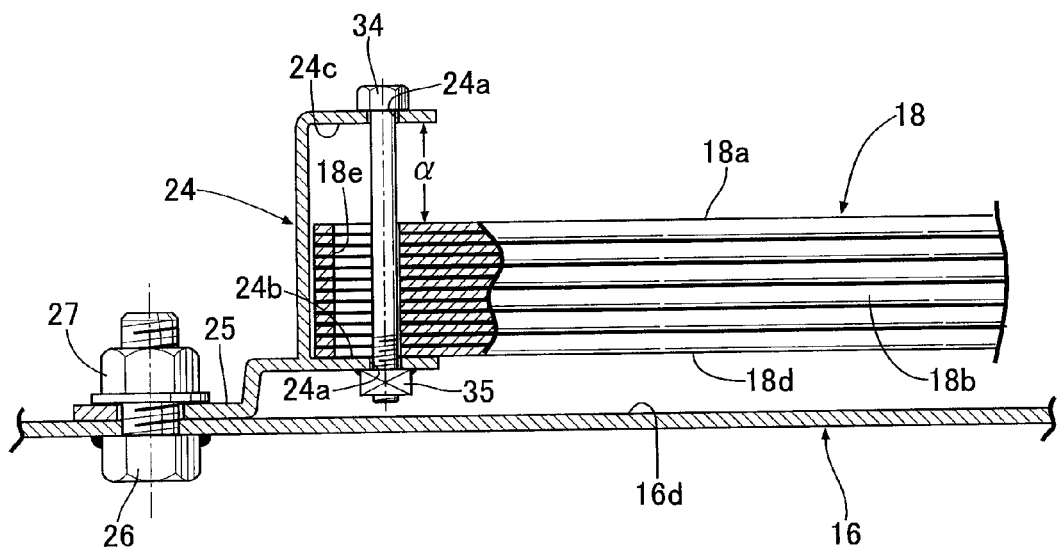
FIGS. 10A and 10B show a second embodiment of the present invention.
Figure 10B:
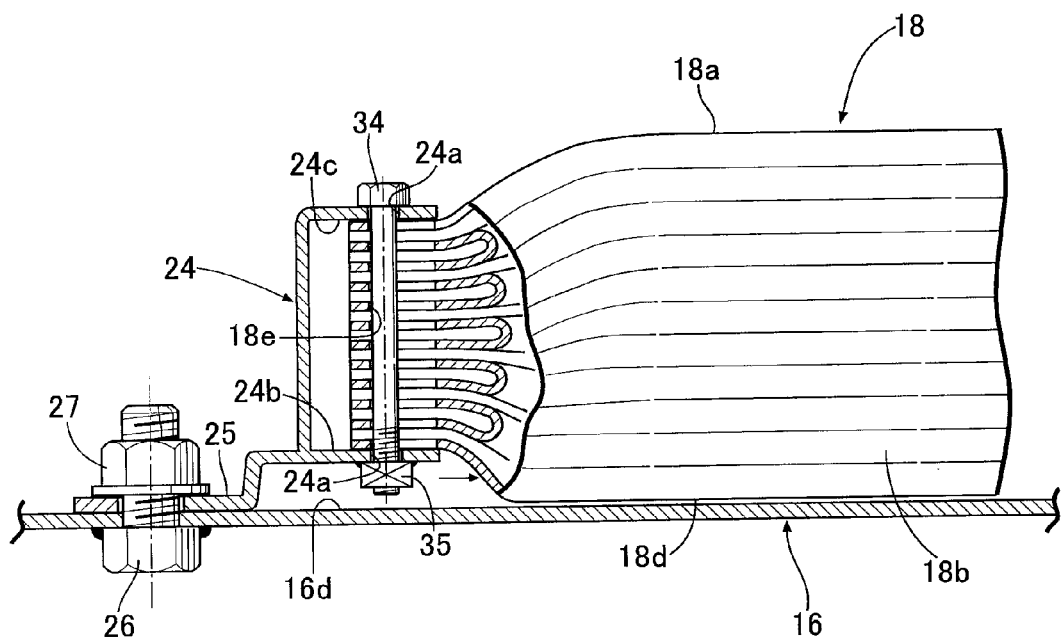

Next, descriptions will be provided for a second embodiment of the present invention based on FIG. 10.

The second embodiment is an airbag system in which a space α is formed between the front surface of the folded airbag 18 and a front surface 24c of each end cap 24 by making the dimensions of each end cap 24 in the front-back directions larger and supporting the back surface of the folded airbag 18 by arbitrary means at a location in which the back surface of the folded airbag 18 is in contact with a back surface 24b of each end cap 24.

When the airbag 18 is deployed, not only the long holes 18e, 18e slides inward along the respective bolts 34, 34 in the longitudinal direction of the airbag 18 but also the opposite end portions of the airbag 18 slides frontward along the respective bolts 34, 34. This enables the opposite end portions of the airbag 18 to be deployed more securely; thus, the airbag 18 can exert excellent shock absorbing performance.

The embodiments of the present invention have been described above. However, various design changes can be made on the present invention within the scope not departing from the gist of the present invention.

For instance, the way of folding the airbag 18 is not limited to the embodiments, and any appropriate way of folding the airbag 18 can be adopted.

What is claimed is:

1. An airbag system comprising:
an airbag made of a folded metal plate; and
cap members which respectively cap opposite end portions of the airbag, the cap members being fixed to a vehicle body panel,
the airbag system protecting a pedestrian by deploying the airbag by use of gas produced by an inflator, wherein
the opposite end portions of the airbag and the respective cap members are connected movably relative to each other so that the opposite end portions move inward in a longitudinal direction of the airbag when the airbag is deployed.

2. An airbag system comprising:
an airbag made of a folded metal plate; and
cap members which respectively cap opposite end portions of the airbag, the cap members being fixed to a vehicle body panel,
the airbag system protecting a pedestrian by deploying the airbag by use of gas produced by an inflator, wherein
the opposite end portions of the airbag and the respective cap members are connected movably relative to each other when the airbag is deployed, and wherein
long holes are formed in the opposite end portions of the airbag, each long hole extending in a longitudinal direction of the airbag, and
shaft members fixed to the cap members penetrate the respective long holes.

3. The airbag system according to claim 2, wherein
a space extending along each of the shaft members is formed between an outer surface of the airbag in a folded state and an inner surface of the corresponding cap member, and
each of the opposite end portions of the airbag is deployed to make the space disappear.

4. The airbag system according to claim 3, wherein,
in the airbag in a folded state,
a surface facing in a front-and-rear direction of a vehicle body is flat; and
a surface facing in a left-and-right direction of the vehicle body is folded in an accordion shape.

5. The airbag system according to claim 4, wherein the cap members are each formed of a box shape having an opening to which the corresponding end portion of the airbag in a folded state is inserted.

6. The airbag system according to claim 3, wherein the cap members are each formed of a box shape having an opening to which the corresponding end portion of the airbag in a folded state is inserted.

7. The airbag system according to claim 2, wherein a gap between the shaft member and the long hole functions as a vent hole of the airbag.

8. The airbag system according to claim 2, wherein,
in the airbag in a folded state,
a surface facing in a front-and-rear direction of a vehicle body is flat; and
a surface facing in a left-and-right direction of the vehicle body is folded in an accordion shape.

9. The airbag system according to claim 8, wherein the cap members are each formed of a box shape having an opening to which the corresponding end portion of the airbag in a folded state is inserted.

10. The airbag system according to claim 2, wherein the cap members are each formed of a box shape having an opening to which the corresponding end portion of the airbag in a folded state is inserted.

11. An airbag system comprising:
an airbag made of a folded metal plate; and
cap members which respectively cap opposite end portions of the airbag, the cap members being fixed to a vehicle body panel,
the airbag system protecting a pedestrian by deploying the airbag by use of gas produced by an inflator, wherein
the opposite end portions of the airbag and the respective cap members are connected movably relative to each other when the airbag is deployed, and wherein,
in the airbag in a folded state,
a surface facing in a front-and-rear direction of a vehicle body is flat; and
a surface facing in a left-and-right direction of the vehicle body is folded in an accordion shape.

12. The airbag system according to claim 11, wherein the cap members are each formed of a box shape having an opening to which the corresponding end portion of the airbag in a folded state is inserted.

13. The airbag system according to claim 11, wherein long holes are formed in the opposite end portions of the airbag, each long hole extending in a longitudinal direction of the airbag, and shaft members fixed to the cap members penetrate the respective long holes.

14. The airbag system according to claim 13, wherein a gap between the shaft member and the long hole functions as a vent hole of the airbag.

15. An airbag system comprising:
an airbag made of a folded metal plate; and
cap members which respectively cap opposite end portions of the airbag, the cap members being fixed to a vehicle body panel,
the airbag system protecting a pedestrian by deploying the airbag by use of gas produced by an inflator, wherein
the opposite end portions of the airbag and the respective cap members are connected movably relative to each other when the airbag is deployed, and wherein the cap members are each formed of a box shape having an opening to which the corresponding end portion of the airbag in a folded state is inserted.

16. The airbag system according to claim 15, wherein long holes are formed in the opposite end portions of the airbag, each long hole extending in a longitudinal direction of the airbag, and shaft members fixed to the cap members penetrate the respective long holes.

17. The airbag system according to claim 16, wherein a gap between the shaft member and the long hole functions as a vent hole of the airbag.

* * * * *